(12) United States Patent
Sivaraman (10) Patent No.: US 9,166,895 B1
(45) Date of Patent: Oct. 20, 2015

(54) DETECTING PROCESS EXECUTION STATE CHANGE USING MEASUREMENT OF RESOURCE CONSUMPTION

(71) Applicant: VMware, Inc., Palo Alto, CA (US)

(72) Inventor: Hari Sivaraman, Livermore, CA (US)

(73) Assignee: VMware, Inc., Palo Alto, CA (US)

( * ) Notice: Subject to any disclaimer, the term of this patent is extended or adjusted under 35 U.S.C. 154(b) by 267 days.

(21) Appl. No.: 13/714,208

(22) Filed: Dec. 13, 2012

(51) Int. Cl.
*H04L 12/26* (2006.01)
*G06F 9/50* (2006.01)
*G06F 11/34* (2006.01)
*H04L 29/06* (2006.01)

(52) U.S. Cl.
CPC .......... *H04L 43/0876* (2013.01); *G06F 9/5077* (2013.01); *G06F 11/3409* (2013.01); *H04L 63/0272* (2013.01)

(58) Field of Classification Search
CPC ............ H04L 41/5035; H04L 63/0272; H04L 43/0876; G06F 11/3409; G06F 9/5066; G06F 11/3452; G06F 9/5077
USPC .......................................................... 709/224
See application file for complete search history.

(56) References Cited

U.S. PATENT DOCUMENTS

| | | | | |
|---|---|---|---|---|
| 5,761,091 A * | 6/1998 | Agrawal et al. | ............... | 702/186 |
| 6,879,926 B2 * | 4/2005 | Schmit et al. | ................. | 702/123 |
| 7,290,259 B2 * | 10/2007 | Tanaka et al. | ..................... | 718/1 |
| 7,293,058 B2 * | 11/2007 | Thurman et al. | ............. | 709/201 |
| 7,512,931 B2 * | 3/2009 | Schmit | ......................... | 717/105 |
| 7,603,478 B2 * | 10/2009 | Thurman et al. | ............. | 709/238 |
| 7,610,233 B1 * | 10/2009 | Leong et al. | .................... | 705/37 |
| 8,046,468 B2 * | 10/2011 | Isci et al. | ...................... | 709/226 |
| 8,121,874 B1 * | 2/2012 | Guheen et al. | ............... | 705/7.11 |
| 8,175,617 B2 * | 5/2012 | Rodriguez | ................. | 455/456.1 |
| 8,612,180 B2 * | 12/2013 | Yan et al. | ...................... | 702/186 |
| 8,660,355 B2 * | 2/2014 | Rodriguez et al. | ............ | 382/181 |

* cited by examiner

Primary Examiner — Kristie Shingles (57) ABSTRACT

A method measures performance for computing entities being run concurrently. A tool manager samples usage of a computing resource associated with a computing entity. A first state is determined based on the usage. Then, the tool manager determines that an application running in the computing entity started execution of a test that is being run in the plurality of computing entities when the usage changes from the first state. Upon determining the change, the tool manager sends a start command to a performance measurement tool that is configured to measure the performance of the computing entity. The tool manager determines the computing entity is in a second state based on the usage and determines the application ended execution of the test when the usage changes from the second state. Upon determining the change, the tool manager sends a stop command to the performance measurement tool.

22 Claims, 7 Drawing Sheets

DETECTING PROCESS EXECUTION STATE CHANGE USING MEASUREMENT OF RESOURCE CONSUMPTION

BACKGROUND

Performance measurement tools assess the relative performance of an object based on an application running in a computing system. For example, the performance measurement tools apply benchmarks or tests to the computing system and measure the performance of computer hardware or the application. The performance measurement tool needs to be started and stopped at certain times so the tool can accurately measure the performance of the computer hardware or the application. For example, when an application starts running, the performance measurement tool may be subsequently started, and when the application stops performing the test, the performance measurement tool should be subsequently stopped. When operating in a single physical computing machine, a user may manually start and stop the performance measurement tool as needed. In this case, a user may determine that the application is starting and then start the performance measurement tool. The user may then determine when the application stops performing the test and stop the performance measurement tool. Because only a single physical computing machine is being used, the starting and stopping is not that much of a burden to the user.

In some cases, the tests are run "at scale", which means multiple performance measurement tools are run concurrently. Having a user manually start and stop the performance measurement tool works well when a single test is being run in a single physical computing machine; however, when running at scale, manually starting and stopping multiple performance measurement tools becomes more difficult. For example, running at scale in a virtualization environment may require testing of hundreds of virtual machines running on a physical computing machine at once. In one example, each virtual machine includes a performance management tool that needs to be started and stopped, which makes the manual starting and stopping of the performance measurement tools very difficult. Further, the operation of virtual machines that are running on the physical computing machine may not be synchronized. For example, virtual machines being tested may not all start in the same instance and execute corresponding operations at the same time. Thus, each virtual machine may have a different start and stop time. A user easily cannot monitor each virtual machine and manually start and stop each performance measurement tool at multiple different times.

SUMMARY

In one embodiment, a method measures performance for a plurality of computing entities being run concurrently. A tool manager samples usage of a computing resource associated with a computing entity in the plurality of computing entities. A first state is determined based on the usage of the computing resource associated with the computing entity. Then, the tool manager determines that an application running in the computing entity started execution of a test that is being run in the plurality of computing entities when the usage of the computing resource changes from the first state. Upon determining the change, the tool manager sends a start command to a performance measurement tool that is configured to measure the performance of the computing entity upon receiving the start command. The tool manager determines the computing entity is in a second state based on the usage of the computing resource associated with the computing entity and determines the application ended execution of the test when the usage of the computing resource changes from the second state. Upon determining the change, the tool manager sends a stop command to the performance measurement tool, which stops measuring the performance upon receiving the stop command.

The following detailed description and accompanying drawings provide a better understanding of the nature and advantages of particular embodiments.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1A:
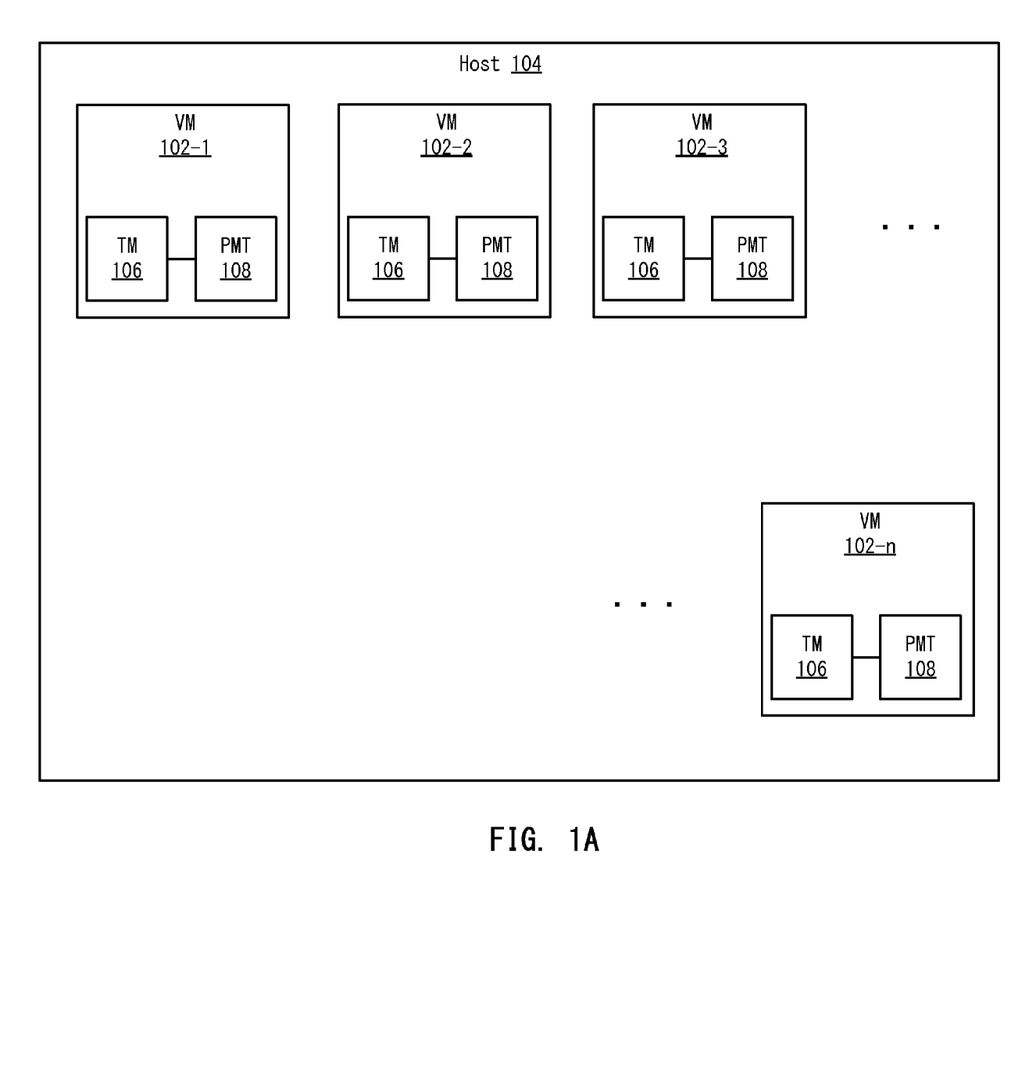
FIG. 1A depicts a system for measuring the performance of multiple virtual machines running on a host according to one embodiment.
Figure 1B:
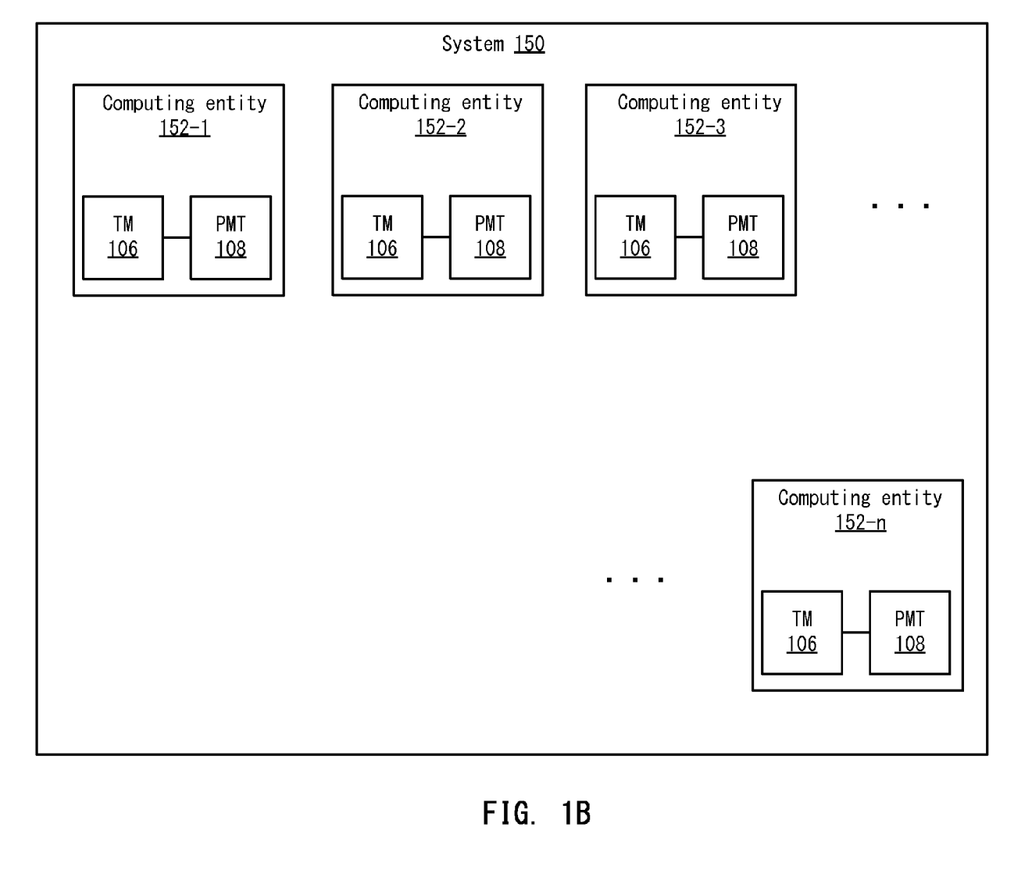
FIG. 1B shows a system including computing entities according to one embodiment.

FIG. 1A depicts a system 100 for measuring the performance of multiple virtual machines 102-1-102-*n* running on a host 104 according to one embodiment. Host 104 may be running multiple virtual machines 102 in a virtualized environment. A person of skill in the art will appreciate how to implement the virtualized environment. Additionally, although one host 104 is shown, the performance of virtual machines 102 on multiple hosts 104 may also be measured. Also, although a virtualized environment is discussed, a non-virtualized environment may be used. For example, FIG. 1B shows a system 150 including computing entities 152-1-152-*n* according to one embodiment. Computing entities 152 may be individual computers, blades, servers, etc. Each computing entity 152 may include a tool manager (TM) 106 and performance measurement tool (PMT) 108, both of which will be described in more detail below. For discussion purposes, particular embodiments may refer to virtual machines 102 and host 104, but various other computing entities may be used.

Tool manager 106 determines when to automatically start and stop performance measurement tool 108 that is measuring the performance of an application (not shown) that is being tested (generally referred to as a test hereinafter). The application being tested, or the "test" may be a benchmark program intended to exercise system resources to test system hardware (including virtual hardware) or may be an application the performance of which is itself the subject of the test. In one embodiment, when performance measurement tool 108 is being run at scale, i.e., in many virtual machines 102 running concurrently, tool manager 106 may start and stop performance measurement tool 108 automatically. In one embodiment, tool manager 106 and performance measurement tool 108 may be running in each virtual machine 102.

As will be described in more detail below, tool manager 106 detects when performance measurement tool 108 should be started and stopped by monitoring usage of computing resources. Because the operation of virtual machines 102 performing a test may not be synchronized, having tool manager 106 analyze computing resources to determine when to start and stop performance measurement tool 108 in each virtual machine 102 may result in more accurate performance measurements. Further, a user does not need to manually start and stop each performance measurement tool 108 in each virtual machine 102 when running the test at scale.

Figure 2:
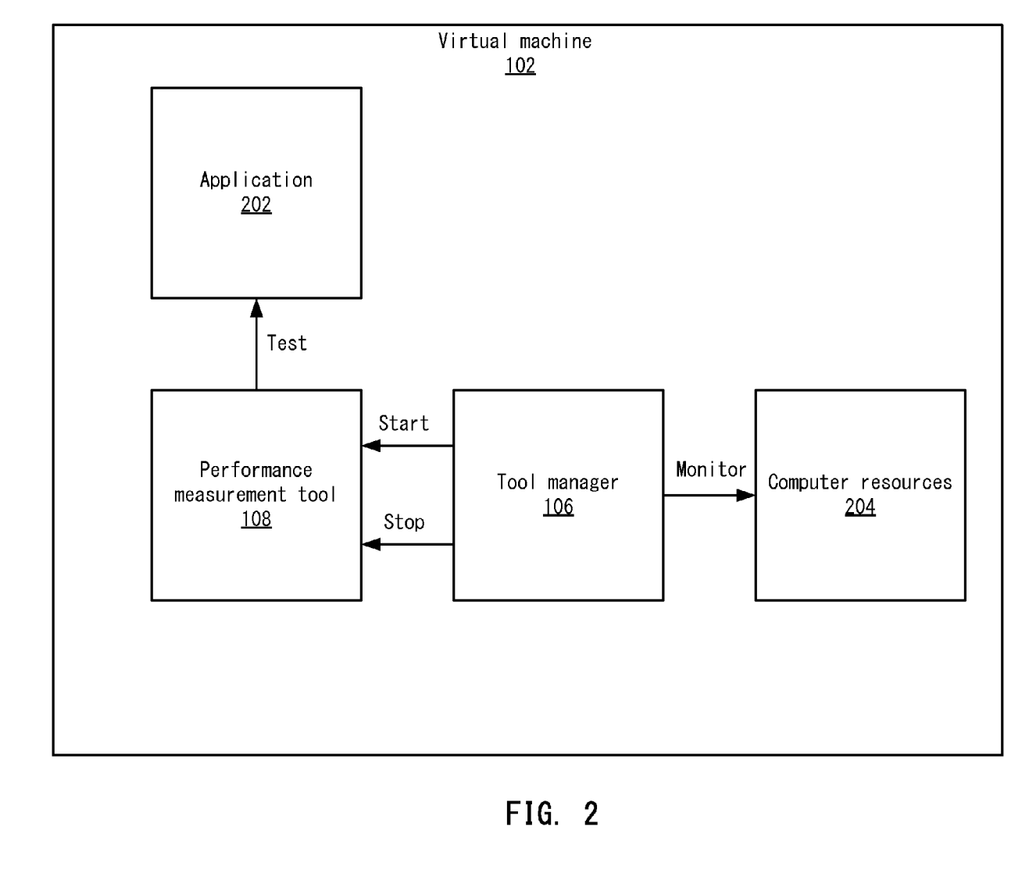
FIG. 2 depicts a more detailed example of a virtual machine according to one embodiment.

FIG. 2 depicts a more detailed example of virtual machine 102 according to one embodiment. The entities shown in virtual machine 102 may be found in multiple virtual machines 102 running in host 104. Also, although the entities are shown running in virtual machine 102, the entities may be run outside of virtual machine 102 also. For example, tool manager 106 and performance measurement tool 108 may be running in the kernel.

An application 202 may be running in virtual machine 102. In one embodiment, performance measurement tool 108 may be performing a benchmark or test with application 202. The benchmark or test may execute application 202 with a designed set of inputs that cause application 202 to perform certain actions. In one embodiment, application 202 may be running in the context of a virtual desktop infrastructure (VDI) environment. In the VDI environment, host 104 and a client device (not shown) use a remoting protocol to display an image of a remote desktop that is running on host 102 on the client device. For example, the client device updates frames of the image on a display. Although a VDI environment is described, it will be understood that particular embodiments may be used with respect to other environments. For example, performance measurement tool 108 may be measuring the performance of a word processing application.

To determine start and stop times, tool manager 106 detects an execution state of application 202 and determines when to start and stop performance measurement tool 108. For example, before application 202 starts running, the use of computing resources 204 may be in a first quiescent state (i.e., hardly any computing resources are being used). When application 202 starts running (e.g., to start running a test), the usage of computing resources 204 may increase. As will be described in more detail below, tool manager 106 determines when the usage of computing resources 204 indicates a state change from the first quiescent state and then tool manager 106 issues a start command to performance measurement tool 108. Performance measurement tool 108 may then start measuring the performance of an object that is being tested. In one example, performance measurement tool 108 may measure the number of frames that are updated on a display of a client device coupled to application 202 when a VDI environment is being used. In other examples, performance measurement tool 108 counts how long it takes for the display of the remote desktop to be updated on the client device or a number of frames sent to update the display.

Computing resources 204 may be computer processing unit (CPU) resources, network usage (e.g., an amount of bandwidth used, such as a bandwidth used to send frame updates to a remote client device), memory, or regions of the screen in which image updates are occurring. For example, if a VDI environment is being used, application 202 may be updating a screen of a remote client device. Tool manager 106 may analyze a screen buffer that is storing image blocks to be updated. When the buffer reaches a threshold, then tool manager 106 can determine that application 202 has started running. Although computing resources 204 are shown as being within virtual machine 102, the measurement of computing resources 204 may be the physical computing resources of host 104 being used by virtual machine 102.

To determine when to stop performance measurement tool 108, tool manager 106 may continue to monitor the usage of computing resources 204. For example, as the test is being run, application 202 continues to use computing resources 204. However, at some point when the test ends, the usage of computing resources 204 by application 202 may decrease. As will be described in more detail below, tool manager 106 determines a second quiescent state that occurs while application 202 is running the test. For example, the usage of computing resources may be within a certain range higher than the first quiescent state while application 202 executes the test. When the usage of computing resources 204 indicates a state change from the second quiescent state, tool manager 106 sends a stop command to performance measurement tool 108. After receiving the stop command, performance measurement tool 108 subsequently stops the measurement of the object being tested.

Figure 3:
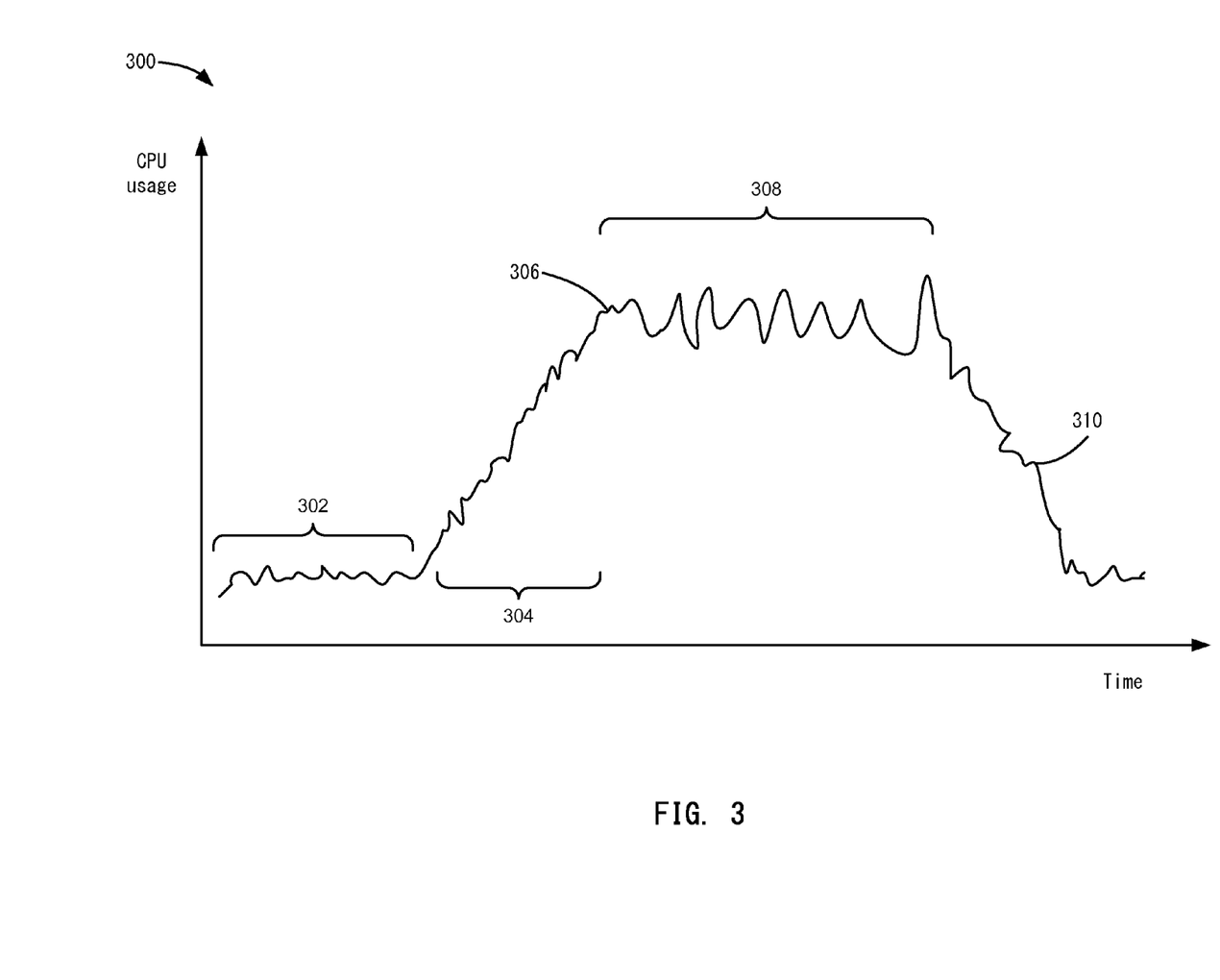
FIG. 3 depicts a graph illustrating usage of computing resources according to one embodiment.

FIG. 3 depicts a graph 300 illustrating usage of computing resources 204 according to one embodiment. As discussed above, tool manager 106 may monitor different computing resources 204. In graph 300, CPU usage is shown versus time, but other computing resources may be monitored. At 302, before application 202 starts execution, tool manager 106 determines a first quiescent state. In this case, the usage of CPU is low because application 202 is not performing any actions related to the test.

In one example, tool manager 106 samples CPU usage using a first sampling frequency to determine data point values. In one embodiment, the sampling frequency may be around 100 Hz. As sampling data point values are collected, tool manager 106 may quantify the CPU usage. For example, tool manager 106 computes the mean and standard deviation on a continuous basis as sampling data point values are received. A quiescent state may be defined when a certain percentage, such as 95%, of the sampled data point values lie within two standard deviations ($2\sigma$) of the mean ($\mu$) or if a pre-defined duration has elapsed. The pre-defined duration may be used just in case 95% of the data point values do not fall within the range.

Tool manager 106 may record the time taken to reach a stable quiescent CPU usage value. In one embodiment, this time may be defined as a measurement window unless the window has already been defined by the user. The window is the range in which tool manager 106 considers sampled data points. In one embodiment, the window is moved as time passes. As tool manager 106 collects additional data point values, the new data point values are added to the measured pool of data point values and older data point values in the pool are then removed. This maintains a sliding window of measured data point values.

Performance measurement tool 108 uses the window to determine when state changes occur. When application 202 starts execution, the CPU usage used by virtual machine 102 starts to increase. In one embodiment, when the CPU usage increases above a certain percentage, tool manager 106 determines that a change from the first quiescent state has occurred. For example, tool manager 106 may continuously calculate the mean of the values that lie within the window for the first quiescent state. The mean may vary as the window is moved. When tool manager 106 determines that 5% of the values in the window lie outside the range of the mean+/−2σ, then tool manager 106 determines that a change from the first quiescent state has occurred and thus application 202 has started execution. Although this method is described, tool manager 106 may use other methods, such as the mean may increase past a threshold indicating that application 202 has started executing.

Using the window to determine when application 202 started execution is useful to accurately determine the state change. For example, if tool manager 106 uses all the CPU usage values collected so far, which may be mathematically equivalent to a window of a large size tending to infinity at the limit, the number of values collected before application 202 started execution may bias the state change detection. If tool manager 106 collected a large number of usage values during the first quiescent state, then tool manager 106 would have to collect a somewhat comparable number of usage values while application 202 is running to effectively detect when 5% of the values fall outside of the range of the mean+/−2σ. Thus, having this large of a window may result in a state change detection that may not be as accurate as needed. Accordingly, particular embodiments may select or define a window that may detect state change that may not be too slow and also too eager to mark every processor usage change as a state change.

Once tool manager 106 detects a change from the first quiescent state, tool manager 106 may send a start command to performance measurement tool 108. In the meantime, once the state change is determined, tool manager 106 may decrease the sampling frequency for sampling data points of the CPU usage. For example, tool manager 106 may exponentially back off or reduce the sampling frequency to avoid excessively disturbing the execution of application 202. In one embodiment, tool manager 106 reduces the frequency of sampling by half on each sampling of a data point until the sampling frequency reaches a limit, such as 1 Hz. Tool manager 106 may not reduce the frequency any further because the sampling frequency should continue at a rate such that another state change can be efficiently detected. Also, tool manager 106 may vary the sampling interval to a random value that is around 1 second, but not exactly 1 second. This avoids missing CPU usage patterns and detecting state changes spuriously because the applications processing CPU usage and measurement mechanism are in resonance.

The time performance measurement tool 108 starts to measure the performance may vary. For example, performance measurement tool 108 may start measuring performance once application 202 starts and the start command is received. In other examples, performance measurement tool 108 may start at a time after application 202 starts. For example, performance measurement tool 108 may start measuring performance after a certain time has passed after receiving the start command or when a second state is determined.

To determine when application 202 stops executing, such as when application 202 has finished performing the test, tool manager 106 first determines a second state. For example, tool manager 106 may determine the second state in a similar manner as the first quiescent state was determined. In this case, when 95% of the sampled values lie within μ+/−2σ or if a pre-defined duration has elapsed, tool manager 106 determines a second quiescent state has started. For example, during a time period 304, CPU usage is increasing. As the window is moved to the right in graph 300, because the values are increasing as shown, it is expected that 95% of the values within the window do not lie within +/−2σ. However, at 306, the start of the second state occurs, and the CPU usage starts to plateau around the same level (with some variations in CPU usage) as can be seen at 308. Thus, as the window moves to the right, at some point, tool manager 106 determines that 95% of the sampled values fall within μ+/−2σ. At this point, tool manager 106 determines the second state has started. Once the second quiescent state is determined, tool manager 106 can calculate the mean of the values within the window and tool manager 106 defines the second quiescent state as the mean of the sampled values μ+/−2σ.

Tool manager 106 may then use the second state to determine when to stop performance measurement tool 108. For example, when application 202 stops executing the test, CPU usage may decrease. In one example, when the mean of CPU usage within the window falls into a range (or below a threshold), tool manager 106 determines that a state change has occurred. In one embodiment, a hysteresis factor (H) is used to determine the range. For example, tool manager 106 determines that application 202 has completed execution when the mean within the window falls within the range of the mean of the first quiescent state (μ1) multiplied by the hysteresis factor (H), i.e., when the mean of the second state (μ2) falls within (μ1*H+/−2σ). In this case, referring to graph 300, tool manager 106 determines application 202 has stopped executing at point 310. This point may be above the mean of CPU usage for the first quiescent state. However, particular embodiments may not need to wait until CPU usage has fallen back to the levels of CPU usage in the first quiescent state. Also, by putting the top of the range at point 310, variations in CPU usage during the second state do not trigger false positives of application 202 finishing the test. That is, some dips in CPU usage may occur, but they do not trigger a determination that application 202 has finished the test.

Figure 4:
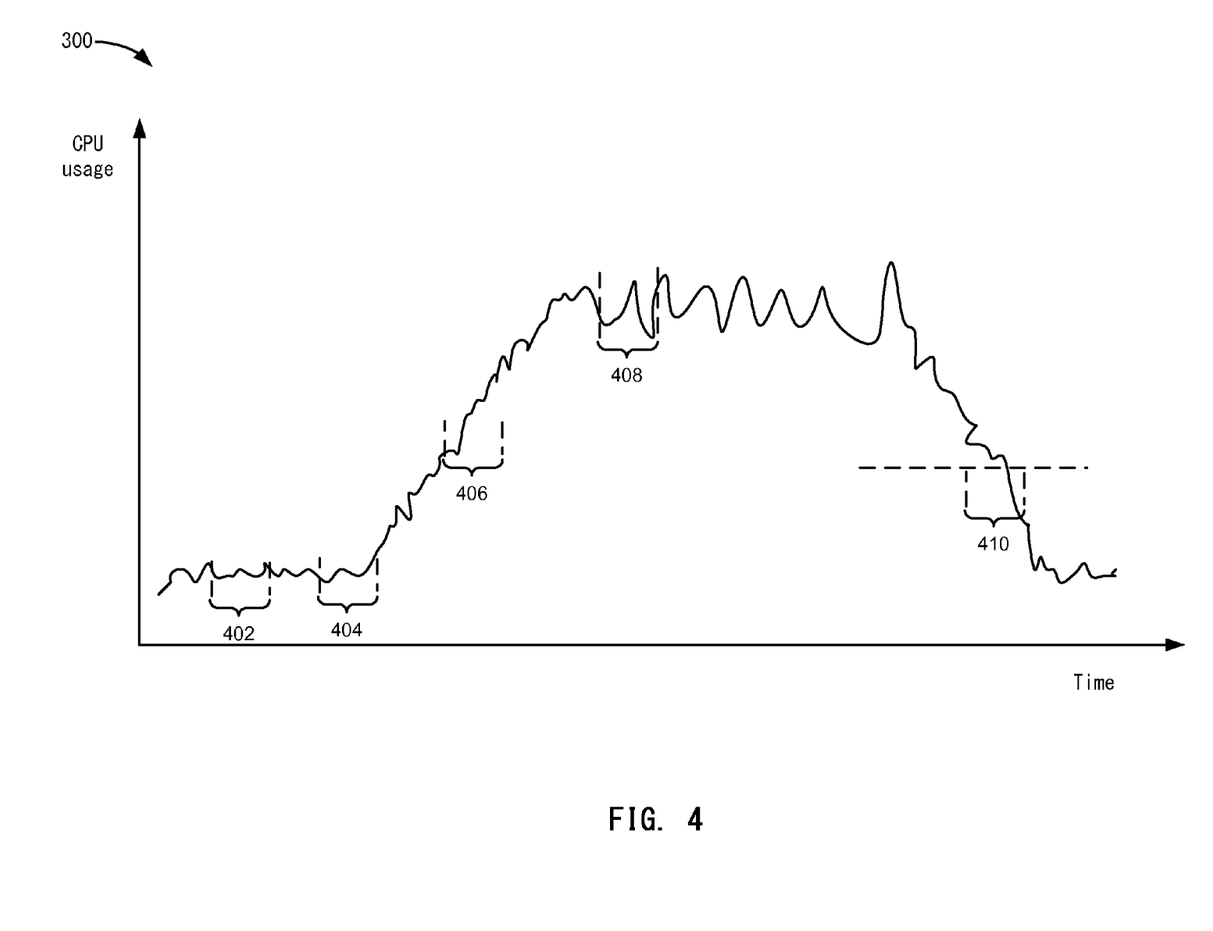
FIG. 4 shows super-imposed windows on the graph shown in FIG. 3 to illustrate the various states according to one embodiment.

FIG. 4 shows super-imposed windows on graph 300 shown in FIG. 3 to illustrate the various states according to one embodiment. At 402, a window has been super-imposed for the values in the first quiescent state. As shown, the values within the window are where 95% of the values are within μ+/−2σ. The window is then moved to the right as time passes. At 404, a window includes values where 5% of the values in the window lie outside of the range of the mean+/−2σ. At this point, tool manager 106 determines that the change from the first quiescent state has occurred. The window continues to move and at 406, the window includes values as CPU usage is increasing. These values do not include values where 95% of the values are within μ+/−2σ because the computer usage is increasing at too high of a rate. Thus, tool manager 106 does not determine a second state has started.

At 408, a window includes values where 95% of the values are within p+/−2σ. Thus, tool manager 106 determines that a second state has occurred.

At 410, the mean of values within the window has now reached the range defined by the hysteresis. Thus, tool manager 106 determines that application 202 has stopped executing the test and tool manager 106 sends the stop command to performance measurement tool 108.

Figure 5:
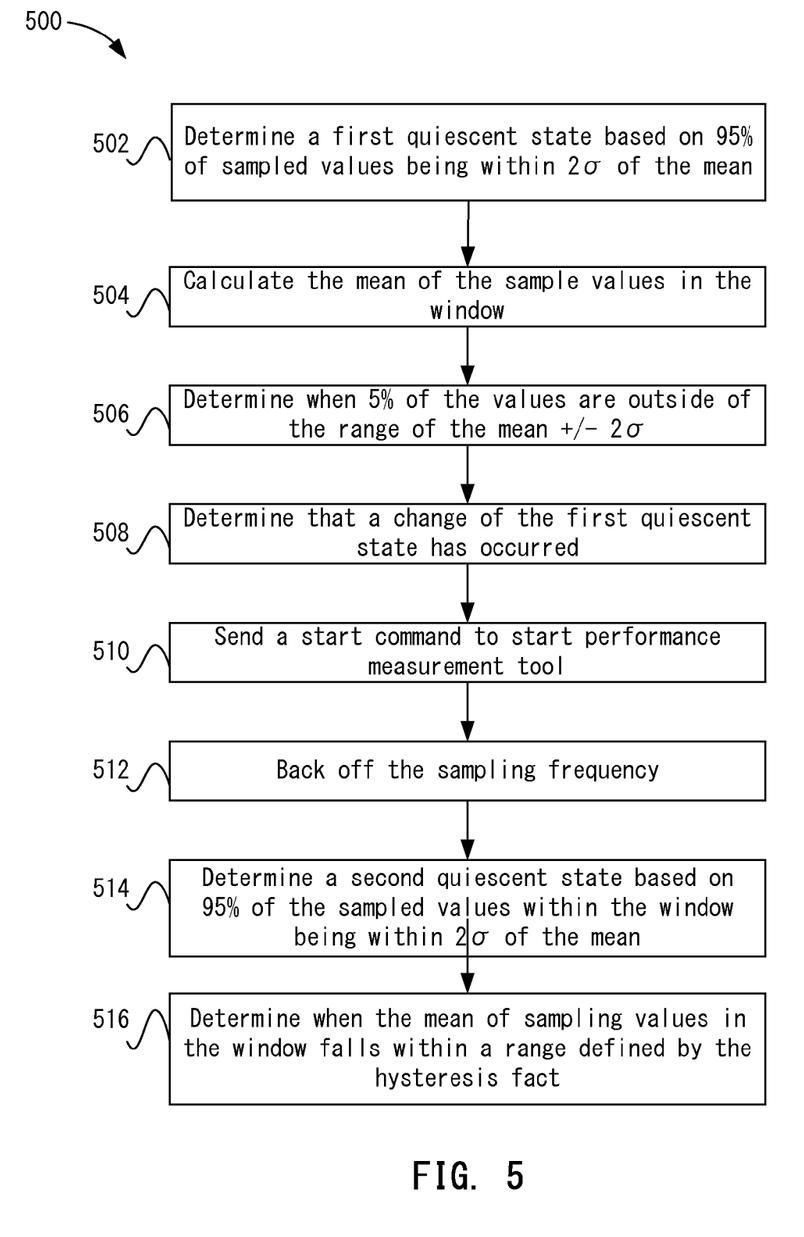
FIG. 5 depicts a simplified flowchart of a method for starting and stopping performance measurement tool according to one embodiment.

FIG. 5 depicts a simplified flowchart 500 of a method for starting and stopping performance measurement tool 108 according to one embodiment. The process described may be performed in each virtual machine 102 running in host 104. This measures performance at scale and does not require users to manually start and stop performance measurement tool 108 in each virtual machine 102. At 502, tool manager 106 determines a first quiescent state based on 95% of sampled values being within 2σ of the mean. As discussed above, the values that are used are in a sliding window. At 504, tool manager 106 calculates the mean of the sample values in the window. This may be performed continuously. At 506, tool manager 106 determines when 5% of the values are outside of the range of the mean+/−2σ. When this occurs, at 508, tool manager 106 determines that a change of the first quiescent state has occurred.

At 510, tool manager 106 then sends a start command to start performance measurement tool 108. As discussed above, performance measurement tool 108 may start measuring performance at some point after the change of the first quiescent state. At 512, tool manager 106 also backs off the sampling frequency.

At 514, tool manager 106 determines a second quiescent state based on 95% of the sampled values within the window being within 2σ of the mean. The second state is when application 202 is executing a test or benchmark.

At 516, tool manager 106 determines when the mean of sampling values in the window falls within a range defined by the hysteresis factor. For example, once CPU usage values fall below a certain point, tool manager 106 sends a signal to performance measurement tool 108 that application 202 has ended execution. Performance measurement tool 108 may then stop measuring performance at this point or at some later point.

Figure 6:
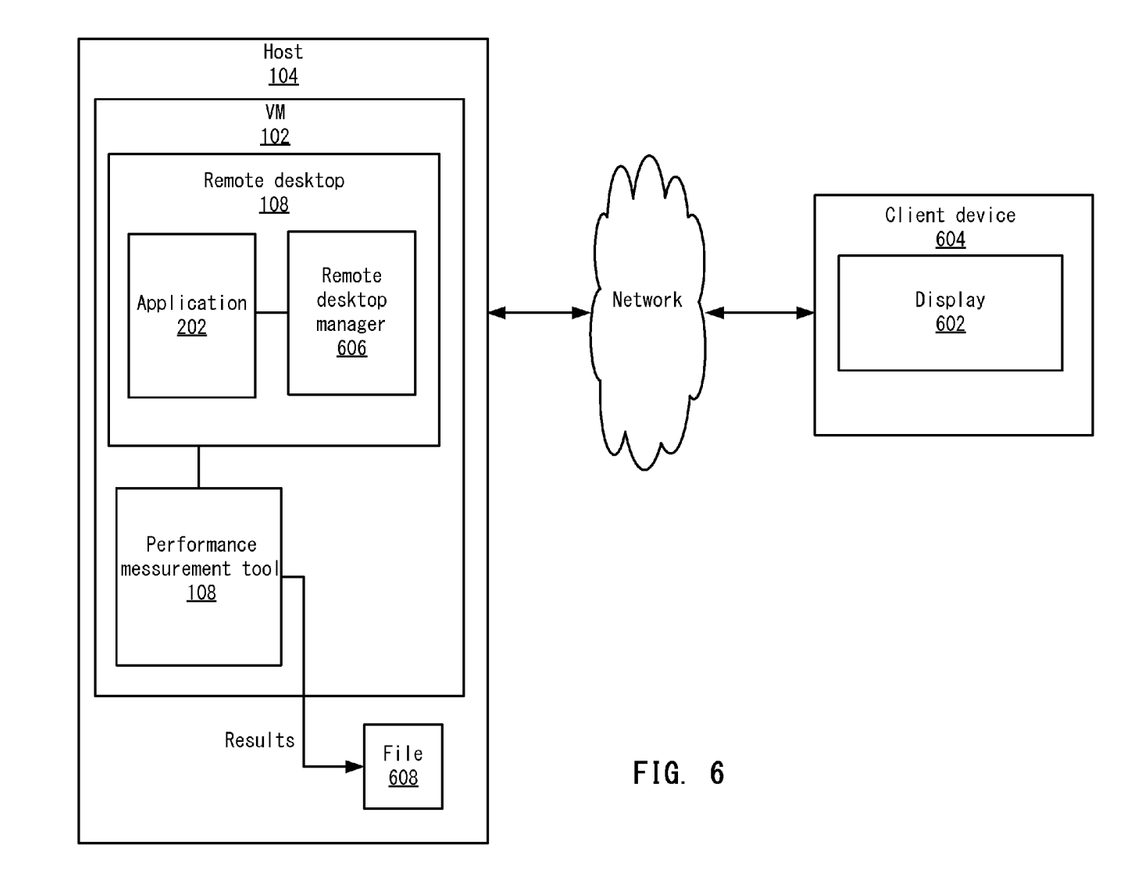
FIG. 6 shows an example of system for a VDI environment according to one embodiment.

Particular embodiments may be used in a VDI environment. FIG. 6 shows an example of system 100 for a VDI environment according to one embodiment. A virtual machine 102 may be running a remote desktop where an image of the remote desktop is displayed on a display 602 of a client device 604. As is known, a remote desktop manager 606 may send frame updates to client device 604 to update the image of the remote desktop on display 602. In one embodiment, remote desktop manager 606 may receive input/output commands from client device 604 and execute those commands using application 202. However, to perform the test, these I/O commands may be input into application 202 automatically without having client device 604 send them through a network. As application 202 executes, the image of the remote desktop changes and remote desktop manager 606 sends frame updates to client device 104.

Performance measurement tool 108 may be measuring different objects while application 202 executes in the VDI environment. For example, performance measurement tool 108 may be measuring CPU usage. In other embodiments, performance measurement tool 108 may measure the network bandwidth used to send the frame updates. For example, performance measurement tool 108 may count how many frames are sent or how many packets are sent by remote desktop manager 606. In another example, performance measurement tool 108 may determine how much of the image of the remote desktop is changed. For example, performance measurement tool 108 may analyze a screen buffer to determine how much image data is stored in the screen buffer to determine how much of the image of the remote desktop has changed.

Once performance measurement tool 108 has stopped the measurement, performance measurement tool 108 outputs the results to a file 608. For example, the file may be sent to an external entity or may be a file stored in storage associated with host 104. File 608 may also store results from additional virtual machines 102 that are running similar tests on host 104.

In one example, application 202 may be a three-dimensional (3D) graphics application. Particular embodiments have a 3D graphics test suite in which tool manager 106 detects when application 202 starts executing and has run to completion with the test. Tool manager 106 detects when to turn on a frame counting measurement of performance measurement tool 108 and when to turn off the measurement.

Particular embodiments rely on a sliding window, a hysteresis effect, and an exponential back-off to detect the state changes in application 202. This approach allows the turning on and off of performance measurement tool 108 when an at-scale test of virtual machines 102 is being performed.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for measuring performance for a plurality of virtual machines being run concurrently, the method comprising:
    sampling usage of a computing resource associated with a virtual machine in the plurality of virtual machines, wherein the virtual machine is using the computing resource when running a test using an application, the test being run by the plurality of virtual machines, and wherein the sampling is performed by a tool manager running in the virtual machine;
    determining, by the tool manager that is running within the virtual machine, that the application running in the virtual machine started execution of the test based on the detecting a first state change from a first state to a second state of usage of the computing resources;
    sending, by the tool manager, a start command to a performance measurement tool that is configured to measure the performance of the virtual machine upon receiving the start command;
    determining, by the tool manager that is running within the virtual machine, the application ended execution of the test based on the detecting a second state change from a third state to a fourth state of usage of the computing resources; and
    sending, by the tool manager, a stop command to the performance measurement tool upon determining the change from the second state, wherein the performance measurement tools stops measuring the performance of the virtual machine upon receiving the stop command.

2. The method of claim 1, wherein a performance measurement tool is started and stopped automatically in each of the plurality of virtual machines.

3. The method of claim 1, wherein sampling the usage comprises continuously sampling the usage of the computing resource.

4. The method of claim 1, wherein the first state change or the second state change is based on sampling point values within a sliding window.

5. The method of claim 4, wherein the first state change is determined based on a number of sampling point values within the window being outside of a mean determined for first state.

6. The method of claim 4, wherein the first state and the third state are determined when a percentage of sampling point values within the window are within an N number of standard deviations, where N is a number.

7. The method of claim 1, further comprising upon determining the first state change, reducing a sampling frequency of the usage of the computing resource.

8. The method of claim 7, wherein the reducing is performed exponentially until a predefined sampling frequency is reached.

9. The method of claim 1, wherein the second state change is determined based on the usage of the computing resource falling below a threshold.

10. The method of claim 9, wherein the threshold is determined based on a hysteresis factor and a mean of the first state.

11. The method of claim 1, wherein:
    the plurality of virtual machines are being run concurrently on a host, and
    the application is running in the virtual machine.

12. The method of claim 11, wherein the virtual machine is operating in a virtual desktop infrastructure (VDI) environment and the performance measurement tool is measuring an object related to the performance of the VDI environment.

13. A non-transitory computer-readable storage medium containing instructions for measuring performance for a plurality of virtual machines being run concurrently, the instructions, when executed, control a computer system to be configured for:
    sampling usage of a computing resource associated with a machine in the plurality of virtual machines, wherein the virtual machine is using the computing resource when running a test using an application, the test being run by the plurality of virtual machines, and wherein the sampling is performed by a tool manager running in the virtual machine;
    determining, by the tool manager that is running within the virtual machine, that the application running in the virtual machine started execution of the test based on the detecting a first state change from a first state to a second state of usage of the computing resources;
    sending, by the tool manager, a start command to a performance measurement tool that is configured to measure the performance of the virtual machine upon receiving the start command;
    determining, by the tool manager that is running within the virtual machine, the application ended execution of the test based on the detecting a second state change from a third state to a fourth state of usage of the computing resources; and
    sending, by the tool manager, a stop command to the performance measurement tool upon determining the change from the second state, wherein the performance measurement tools stops measuring the performance of the virtual machine upon receiving the stop command.

14. The non-transitory computer-readable storage medium of claim 13, wherein a performance measurement tool is started and stopped automatically in each of the plurality of virtual machines.

15. The non-transitory computer-readable storage medium of claim 13, wherein the first state change or the second state change is based on sampling point values within a sliding window.

16. The non-transitory computer-readable storage medium of claim 15, wherein the first state change is determined based on a number of sampling point values within the window being outside of a mean determined for first state.

17. The non-transitory computer-readable storage medium of claim 15, wherein the first state and the third state are determined when a percentage of sampling point values within the window are within an N number of standard deviations, where N is a number.

18. The non-transitory computer-readable storage medium of claim 13, further comprising upon determining the first state change, reducing a sampling frequency of the usage of the computing resource.

19. The non-transitory computer-readable storage medium of claim 13, wherein the second state change is determined based on the usage of the computing resource falling below a threshold.

20. The non-transitory computer-readable storage medium of claim 13, wherein:
the plurality of virtual machines are being run concurrently on a host, and
the application is running in the virtual machine.

21. The non-transitory computer-readable storage medium of claim 20, wherein the virtual machine is operating in a virtual desktop infrastructure (VDI) environment and the performance measurement tool is measuring an object related to the performance of the VDI environment.

22. An apparatus configured to measure performance for a plurality of virtual machines being run concurrently, the apparatus comprising:

one or more computer processors; and
a non-transitory computer-readable storage medium comprising instructions, that when executed, control the one or more computer processors to be configured for:
sampling usage of a computing resource associated with a virtual machine in the plurality of virtual machines, wherein the virtual machine is using the computing resource when running a test using an application, the test being run by the plurality of virtual machines, and wherein the sampling is performed by a tool manager running in the virtual machine;
determining, by the tool manager that is running within the virtual machine, that the application running in the virtual machine started execution of the test based on the detecting a first state change from a first state to a second state of usage of the computing resources;
sending, by the tool manager, a start command to a performance measurement tool that is configured to measure the performance of the virtual machine upon receiving the start command;
determining, by the tool manager that is running within the virtual machine, the application ended execution of the test based on the detecting a second state change from a third state to a fourth state of usage of the computing resources; and
sending, by the tool manager, a stop command to the performance measurement tool upon determining the change from the second state, wherein the performance measurement tools stops measuring the performance of the virtual machine upon receiving the stop command.

* * * * *